United States Patent
Winter, IV

(10) Patent No.: US 7,665,799 B1
(45) Date of Patent: Feb. 23, 2010

(54) TRUCK BED EXTENSION AND ROLL BAR APPARATUS

(75) Inventor: Amos G Winter, IV, Concord, NH (US)

(73) Assignee: Appropriate Combined Technologies, LLC, Santa Clara, CA (US)

(*) Notice: Subject to any disclaimer, the term of this patent is extended or adjusted under 35 U.S.C. 154(b) by 282 days.

(21) Appl. No.: 11/853,868

(22) Filed: Sep. 12, 2007

Related U.S. Application Data

(60) Provisional application No. 60/825,753, filed on Sep. 15, 2006.

(51) Int. Cl.
*B62D 33/00* (2006.01)

(52) U.S. Cl. .................................... 296/183.1

(58) Field of Classification Search .............. 296/183.1, 296/183.2, 50, 26.11, 37.6, 180.1; 224/403; 293/102; 280/164.1
See application file for complete search history.

(56) References Cited

U.S. PATENT DOCUMENTS

| | | | | |
|---|---|---|---|---|
| 3,244,251 A | * | 4/1966 | Duncan | ...................... 296/102 |
| 3,292,726 A | | 12/1966 | Jette, Jr. | |
| 3,508,785 A | | 4/1970 | Chang | |
| 3,905,493 A | * | 9/1975 | Logue | ......................... 296/56 |
| 4,089,542 A | | 5/1978 | Westerman | |
| 4,171,141 A | | 10/1979 | Hobrecht | |
| 4,557,502 A | | 12/1985 | Scaduto et al. | |
| 4,571,144 A | * | 2/1986 | Guidry et al. | ............... 414/537 |
| 4,770,458 A | * | 9/1988 | Burke et al. | .................... 296/3 |
| 4,778,213 A | | 10/1988 | Palmer | |
| 4,830,402 A | | 5/1989 | Matthias et al. | |
| D305,111 S | * | 12/1989 | Zagner | ...................... D12/412 |
| 4,884,838 A | | 12/1989 | Slater | |
| 4,915,437 A | * | 4/1990 | Cherry | ...................... 296/37.6 |
| 4,978,161 A | * | 12/1990 | Schulze | ................... 296/180.1 |
| 5,056,816 A | | 10/1991 | Liitze et al. | |
| 5,094,478 A | | 3/1992 | Pfanzeder et al. | |
| 5,169,201 A | | 12/1992 | Gower | |
| 5,224,735 A | | 7/1993 | Jambor et al. | |
| 5,284,360 A | | 2/1994 | Busch et al. | |
| 5,393,093 A | | 2/1995 | Wiinsche et al. | |
| 5,449,212 A | * | 9/1995 | Seifert | ....................... 296/57.1 |
| 5,456,511 A | | 10/1995 | Webber | |
| 5,492,259 A | * | 2/1996 | Tippets | ........................ 296/10 |
| 5,641,193 A | * | 6/1997 | Zepnik et al. | .......... 296/193.04 |
| 5,669,654 A | | 9/1997 | Eilers et al. | |
| 5,700,047 A | | 12/1997 | Leitner et al. | |
| 5,752,800 A | | 5/1998 | Brincks et al. | |

(Continued)

*Primary Examiner*—Kiran B. Patel
(74) *Attorney, Agent, or Firm*—Vern Maine & Associates

(57) ABSTRACT

A vehicle tailgate system is provided, the system comprising: A primary arch, the primary arch being hingably coupled to a vehicle bed of said vehicle; An actuator whereby the primary arch is rotated between a fully deployed roll bar position, and a fully stowed position; A channel, configured to receive the primary arch disposed in the pickup vehicle bed, the channel running down a first side of the bed, between exterior and interior walls of the first side, along the bottom of the pick up vehicle bed beneath the floor of the vehicle bed, and up a second side of the bed between exterior and interior walls of the second side of the vehicle bed. The bumper can be lowered to allow the arch to pass. The bumper mechanism may also include accommodation for the tailgate. The moving bumper can also lower and lift a trailer hitch or work with the tailgate to create a lift gate.

10 Claims, 8 Drawing Sheets

U.S. PATENT DOCUMENTS

| | | |
|---|---|---|
| 5,857,724 A | 1/1999 | Jarman |
| 5,911,464 A * | 6/1999 | White ............... 296/26.11 |
| 5,918,925 A | 7/1999 | Perrin |
| 5,924,753 A | 7/1999 | DiBassie |
| 5,954,364 A | 9/1999 | Nechushtan |
| 6,113,173 A | 9/2000 | Leitner et al. |
| 6,217,104 B1 | 4/2001 | Neubrand |
| 6,279,980 B1 | 8/2001 | Straschewski |
| 6,283,525 B1 | 9/2001 | Morse |
| 6,293,605 B2 | 9/2001 | Neubrand |
| 6,367,858 B1 | 4/2002 | Bradford |
| 6,378,926 B1 | 4/2002 | Renze et al. |
| 6,419,294 B2 | 7/2002 | Neubrand |
| 6,447,040 B1 * | 9/2002 | Young, Sr. ............. 296/61 |
| 6,513,688 B2 | 2/2003 | Kmita et al. |
| 6,540,123 B1 | 4/2003 | Kmita et al. |
| 6,572,145 B1 | 6/2003 | Guillez et al. |
| 6,598,922 B2 | 7/2003 | Morse et al. |
| 6,609,743 B1 * | 8/2003 | Stevenson ............ 296/26.11 |
| D501,443 S | 2/2005 | Jones, Sr. et al. |
| 6,866,323 B2 | 3/2005 | Guillez et al. |
| 6,883,849 B2 | 4/2005 | Hebert |
| 6,948,763 B2 | 9/2005 | Robbins |
| 6,991,277 B1 * | 1/2006 | Esler ..................... 296/50 |
| 6,994,389 B1 | 2/2006 | Graffy et al. |
| 7,464,976 B2 * | 12/2008 | Smith ................. 296/26.11 |

* cited by examiner

TRUCK BED EXTENSION AND ROLL BAR APPARATUS

RELATED APPLICATIONS

This application claims the benefit of U.S. Provisional Application No. 60/825,753, filed Sep. 15, 2006. This application is herein incorporated in its entirety by reference.

FIELD OF THE INVENTION

The invention relates to pick up truck and sport utility vehicle bed extenders, and more particularly, to a pick up bed extender convertible to a roll bar and configured with a multifunction bumper tailgate combination.

BACKGROUND OF THE INVENTION

Compact or short bed pickup trucks and similar vehicles have become increasingly popular with consumers. This is due in part to increased consumption on the part of American consumers, who require larger vehicles to transport goods, either from purchases or for trips. On frequently voiced objection to such vehicle is the inadequate length of the truck bed. While traditional pickup trucks may be 8 or 6 feet in length, newer compact pickups may sacrifice bed length for an extended cab, providing only a 4 foot bed, or in some cases even shorter beds. Such shorter beds are inadequate to transport long boards, sheets of plywood, mattresses, farm implements and equipment, and some items of furniture, items traditional transported in pickup trucks. Even when the size of a single item is not too long for the truck bed, diminutive truck beds may for the user into making multiple trips to carry collections of items, like garbage. Multiple trips waste time and fuel.

Known extenders, when not in use, typically take up space in the truck bed or must be removed. Those that do stow do not permit use as a rack for ladders and other long items, or contribute to the integrity of the vehicle and safety of occupants of the bed in the event of a vehicle roll over.

What is needed, therefore, are techniques for extending the useable space provided by a vehicle and increasing the usefulness of that space.

SUMMARY OF THE INVENTION

One embodiment of the present invention provides a vehicle tailgate system, the system comprising: A primary arch, the primary arch being hingably coupled to a vehicle bed of said vehicle; An actuator whereby the primary arch is rotated between a fully deployed roll bar position, and a fully stowed position; A channel, configured to receive the primary arch disposed in the pickup vehicle bed, the channel running down a first side of the bed, between exterior and interior walls of the first side, along the bottom of the pick up vehicle bed beneath the floor of the vehicle bed, and up a second side of the bed between exterior and interior walls of the second side of the vehicle bed.

Another embodiment of the present invention provides such a system wherein the actuator comprises a drive mechanism selected from the group of drive mechanisms consisting of screw actuators, pneumatic drives, hydraulic drives, rotary actuators and chain drives.

A further embodiment of the present invention provides such a system further comprising a vehicle bumper configured to be lowered.

Still another embodiment of the present invention provides such a system further comprising a stowable tailgate wherein the bumper which is configured with a chamber to receive the tailgate.

A still further embodiment of the present invention provides such a system wherein the tailgate is stowed manually or with power.

Even another embodiment of the present invention provides such a system wherein a tailgate is configured to extend into a loading ramp.

An even further embodiment of the present invention provides such a system wherein a tailgate in the open position is configured as a lift gate, the lift gate held substantially parallel to the ground by at least one restraint wire, strap or linkage, coupled at a first end to the tailgate, and to the chassis of the vehicle at a second end, the restraint passing through an aperture in a bumper.

Yet another embodiment of the present invention provides such a system wherein a bumper is configured to move vertically.

A yet further embodiment of the present invention provides such a system wherein the primary arch is configured to be stowed behind the bumper.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
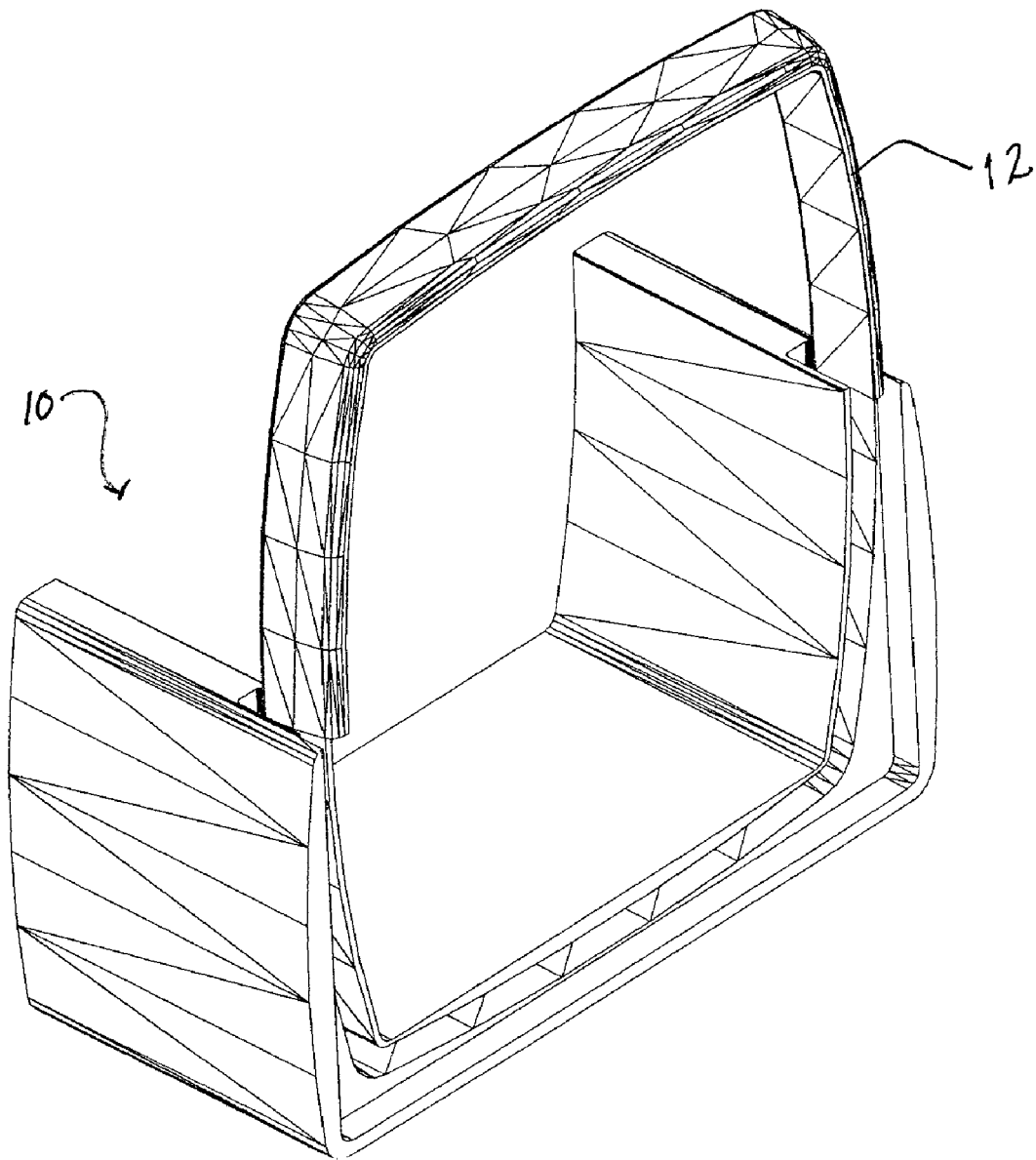
FIG. 1A is a perspective view illustrating a truck bed having a rotating roll-bar/truck bed extender arch configured in accordance with one embodiment of the present invention with that arch in a fully deployed position.

In one embodiment of the present invention, a rigid roll bar or ladder rack 12 is provided at the rear of the bed of a truck or sport utility vehicle. The roll bar or ladder rack 12 mounted on sidewalls above the bed is rotatable such that it can be used to extend the usable area of the bed by acting like a tail gate for items that extend beyond the usual bed and on to the open tailgate. The roll bar or ladder support 12 may also form part of a convertible sport utility vehicle roof, such as that described in U.S. patent application Ser. No. 11/030,446 filed Jan. 6, 2005, which is incorporated herein by reference in its entirety. The roll bar 12 may be further rotated to be stowed beneath the bed. A lowering bumper 14 may also be provided to allow passage of the roll bar or ladder rack 12 to and from its stowed position. Such a lowering bumper 14 could be used to facilitate other functions, including, but not limited to raising or lowering the trailer hitch 16 or the open tailgate platform 18. Such an embodiment may also provide a horizontal well 20 wherein the tailgate can be stowed. The tailgate 18 may be stowed manually or may be power actuated. In such an embodiment, the tailgate 18 may be hidden from view, permitting improved visibility when connecting a trailer hitch 16, loading the vehicle, or performing other tasks that require one in the passenger cabin to look back past the tailgate 18. In another such embodiment, the tailgate 18 may be configured to hinge from the bumper 14. Restraint cables 22 may be affixed, as illustrated in FIG. 5I, through the moving bumper 14 to the chassis 26 creating a linkage 21 that holds the tailgate 18 level through its vertical travel, making it a lift gate. The tailgate 18 could also have the ability to be expanded with either a folding or telescoping section 28 making it a more functional loading ramp. The ramp extension of the tailgate 18 telescopes from the tailgate 18. It is, in one embodiment constructed of ribs (not illustrated) that telescope and a false inner tailgate face (not illustrated) that moves with the ribs providing a surface over the extended ribs. This gives the extended tailgate rigidity rather than having it hinged in the middle.

Various embodiments of the invention are described below in more detail with reference to the figures.

Figure 1B:
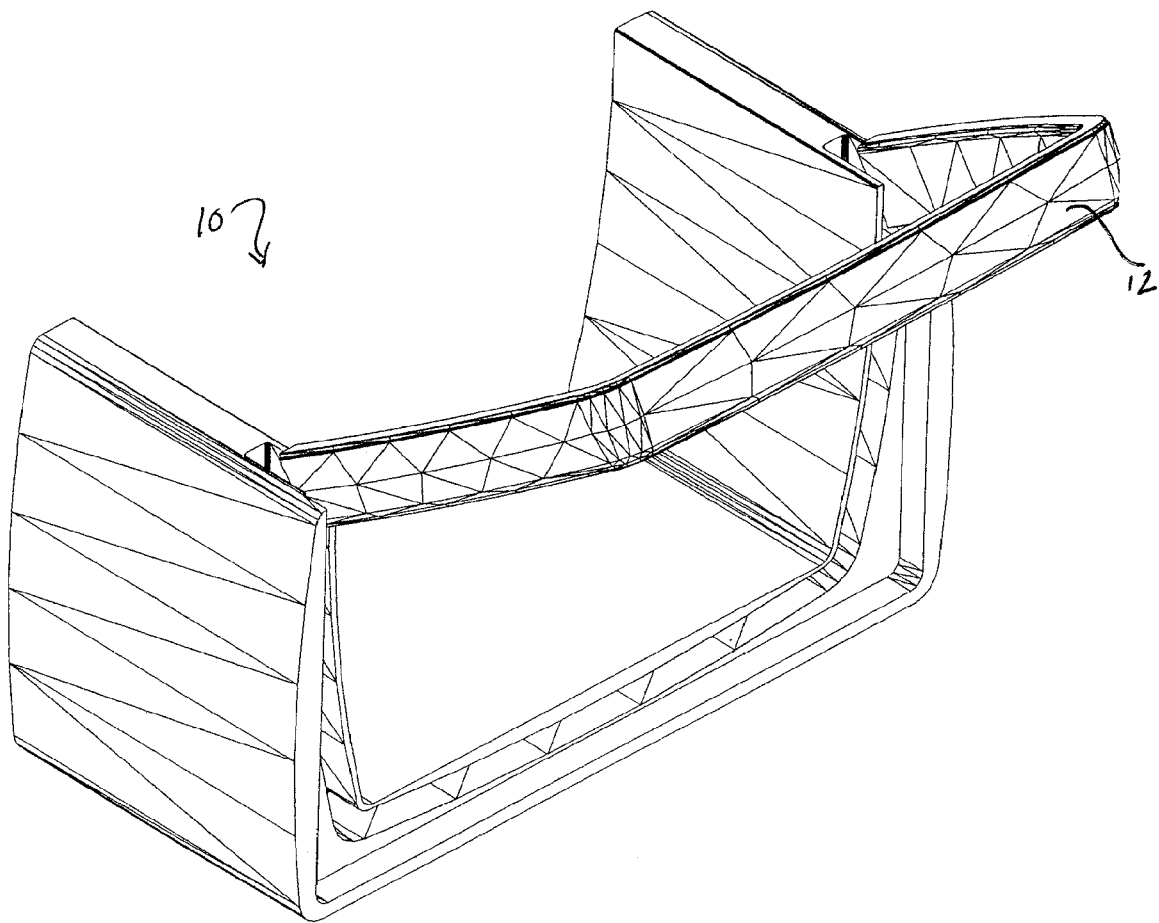
FIG. 1B is a perspective view illustrating a truck bed having a rotating roll-bar/truck bed extender arch configured in accordance with one embodiment of the present invention with that arch in a partially deployed position.

As illustrated in FIGS. 1A and 1B, a truck bed extender 12 may be hingeably disposed within the rear, or opening face of a truck bed 10, and, when closed disposed proximate to or behind the tail lights (not shown). In one embodiment of the present invention, the truck bed extender provides a primary arch 12 which is coupled to the upper ends of the rear face of the truck bed 10. The primary arch 12 is hinged at its point of attachment, having, in one embodiment, near 180° freedom of movement, rotating from a fully upright roll bar position to a fully stowed position.

Figure 3:
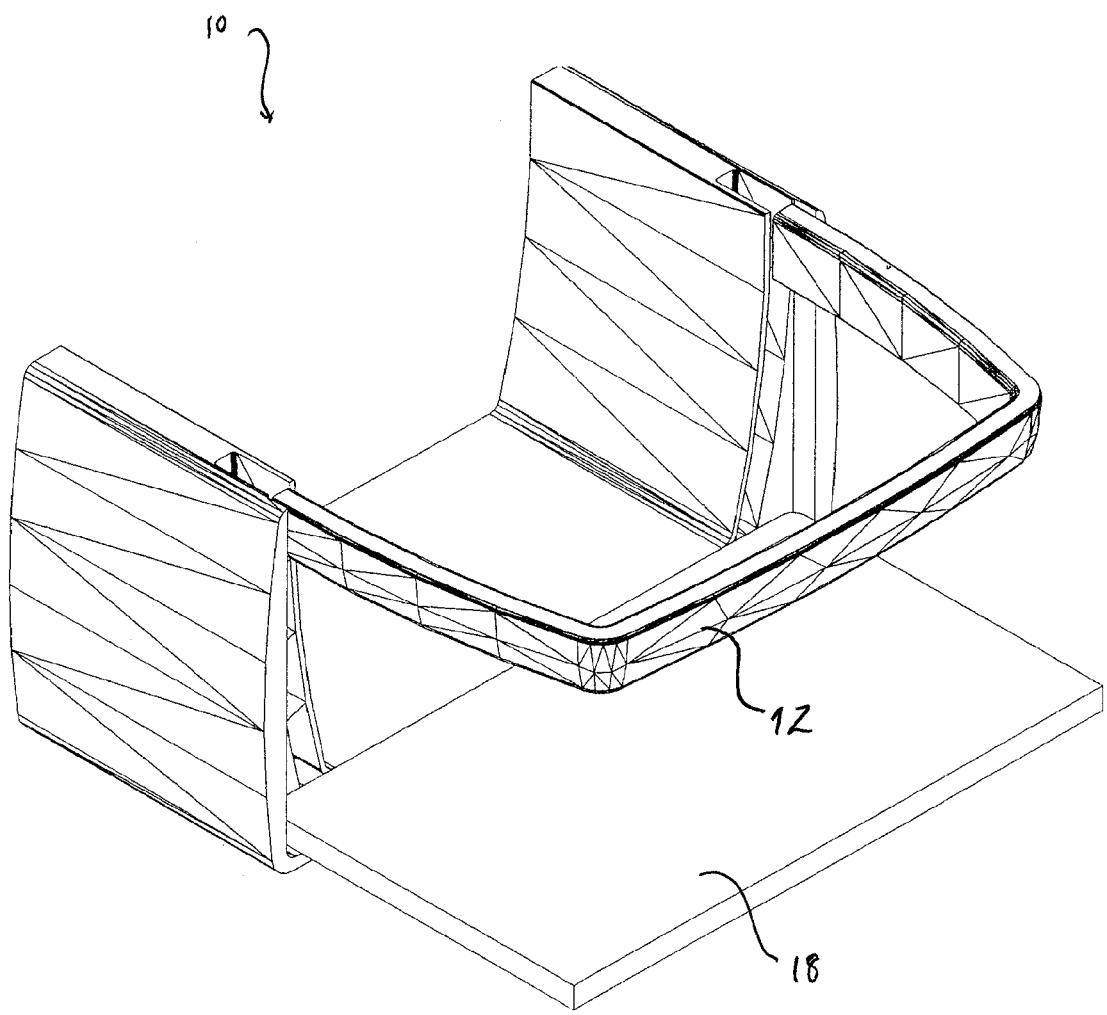
FIG. 3 is a perspective view illustrating a truck bed having a rotating roll-bar/truck bed extender arch configured in accordance with one embodiment of the present invention with that arch in a truck extension position.

In one embodiment a net or other retaining device may be deployed from the primary arch when the primary arch 12 is in an approximately 90° angle position illustrated in FIG. 3, placing it parallel to the open tailgate of the truck bed, and which could be coupled to the tailgate to retain contents of the bed within the bed. In alternative embodiments secondary arches 30, such as those illustrated in FIG. 4 may be used as a retaining device. Such secondary arches 30 may be stowable within the primary arch, or may be independently coupled to the truck bed 10. Alternatively, the secondary arches may be nested or stacked proximate to the primary arch In one embodiment of the present invention, the primary arch 12 may be deployable by motors or other actuators, such as, but not limited to, helical cables, threaded rods, hydraulic pistons or combinations thereof. One skilled in the art will appreciate that other actuation devices may be utilized which impel the primary arch 12 between an upright deployed position and a stowed position.

According to one embodiment, the primary arch 12 may be configured from tubular steel, similar in composition to that used in the construction of the vehicle. Alternative embodiments wherein the primary arch 12 is composed of stainless steel, ceramic composites, graphite composites, reinforced fiberglass, titanium alloys, and other high strength materials. Hinges, trunions or other structures by which the arch is connected to the body may also be configured of high strength materials, and be configured with sufficient heft as to resist impact and crushing forces in a collision, crash, or roll over.

One skilled in the art will appreciate that secondary arches 30 may be less rigid than the primary arch 12 in some embodiments, while in others higher rigidity may be desired. Suitable secondary arch components may be configured from plastic, steel, aluminum, titanium, composites, graphite, fiber glass, and other materials. As noted above, in some embodiments, instead of secondary arches, nets or cloth may be stretched or otherwise extended between a lowered tail gate 18, and the primary arch 12 when that arch is positioned approximately parallel to the lowered tail gate. Such nets or clothes may be configured from rubber, neoprene, canvas, nylon, polyaramid, polyester, polypropylene, or cotton. The material may be woven, braided, rubberized, or otherwise treated to improve its tensile strength, durability, resistance to abrasion, resistance to environmental exposure. Straps or cords of such materials may, in some embodiments, be used in combination with secondary arches to provide greater structural stability to the extension. Elastic straps or nets may, in some embodiments be provided to accommodate variations in the size and shape of truck bed contents. Straps or nets may be coupled to the primary arch and to the tail gate by clips, hooks, splines, clamps, loops, snaps, buttons, or sleeves.

Figure 2:
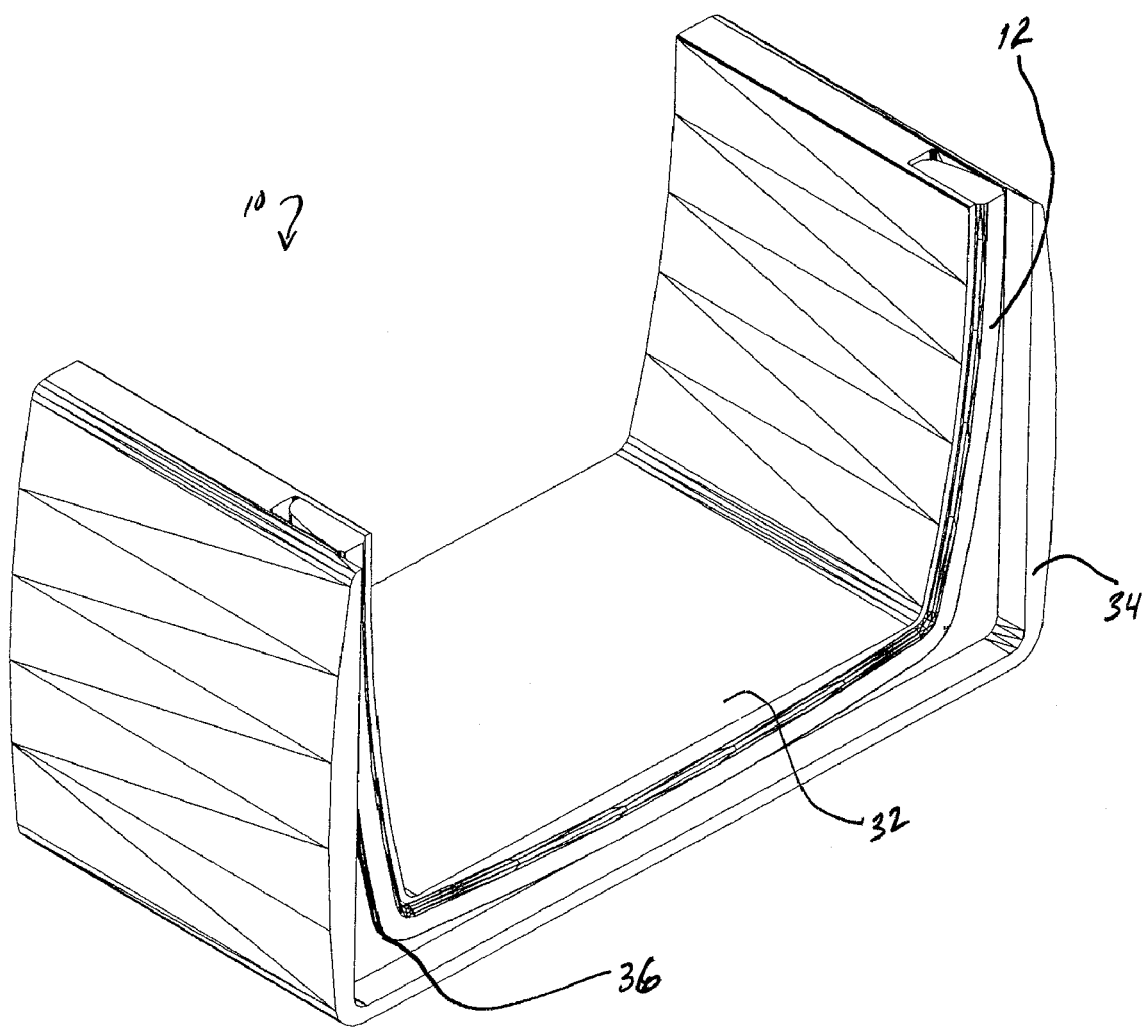
FIG. 2 is a perspective view illustrating a truck bed having a rotating roll-bar/truck bed extender arch configured in accordance with one embodiment of the present invention with that arch in a fully stowed position.

FIG. 2 illustrates the primary arch disposed in a stowed position, with the tailgate removed for clarity. As can be seen, the arch 12 is disposed within the walls of the truck bed, protected from abrasion and impact by the bed lining 32 and the bed exterior 34. The arch 12 is disposed within a channel 36 configured to receive the arch 12 disposed along the end of the bed walls and the bed floor. The channel is likewise configured, in some embodiments, to receive the secondary arches 30 as well. Tail lights and other trim, not shown, may be applied to the end to close the channel when the arch is in a fully stowed position, or when it is in a fully deployed, roll bar position. Such trim may, alternatively be permanently affixed to the end of the truck bed walls in such a way as not to obstruct the passage of the primary arch in its rotation.

Figure 4:
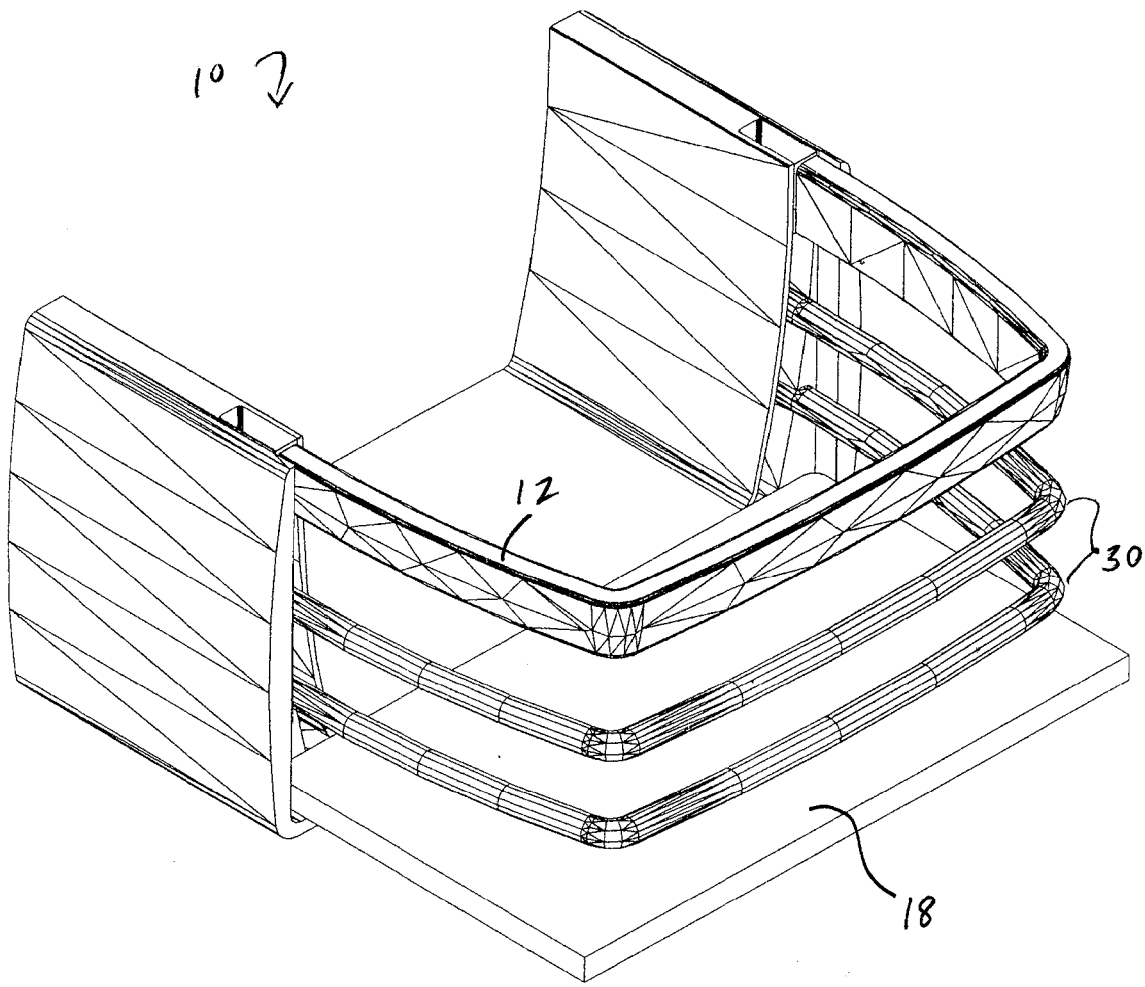
FIG. 4 is a perspective view illustrating a truck bed having a rotating roll-bar/truck bed extender arch configured in accordance with one embodiment of the present invention having a plurality of secondary arches.

FIG. 3 illustrates the primary arch 12 of one embodiment deployed in a bed extending position. In such an embodiment the arch is rotated to be positioned approximately parallel to the lowered tailgate 18. In this way, items disposed within the truck bed are afforded a barrier to prevent them from sliding out the open tailgate of the truck. As illustrated in FIG. 4, secondary arches 30 may be disposed between the primary arch deployed in its bed extension position and the open tail gate. As discussed above the secondary arches 30 need not be configured from the same materials as the primary arch 12, and may be stowed either in, stacked or nested with the primary arch 12 or, like the primary arch 12, stowed in the truck bed body channel 36.

Figure 5A:
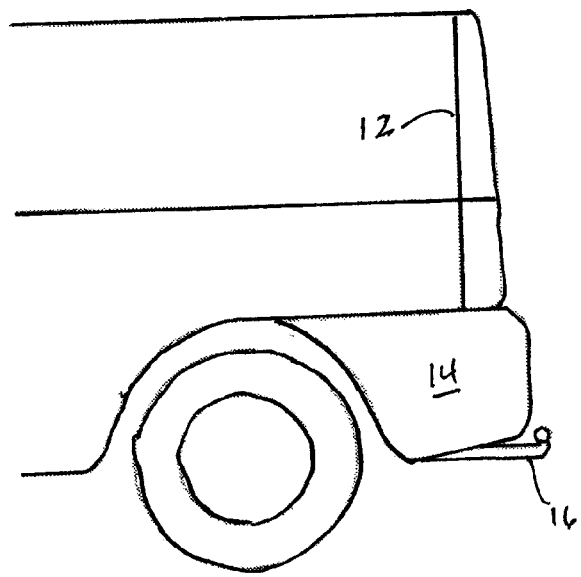
FIGS. 5A-5I illustrate partial elevation views of a vehicle configured according to one embodiment of the present invention undergoing the process by which a rear roll bar configured according to one embodiment of the present invention is stowed and a tailgate lift or ramp is deployed.
Figure 5B:
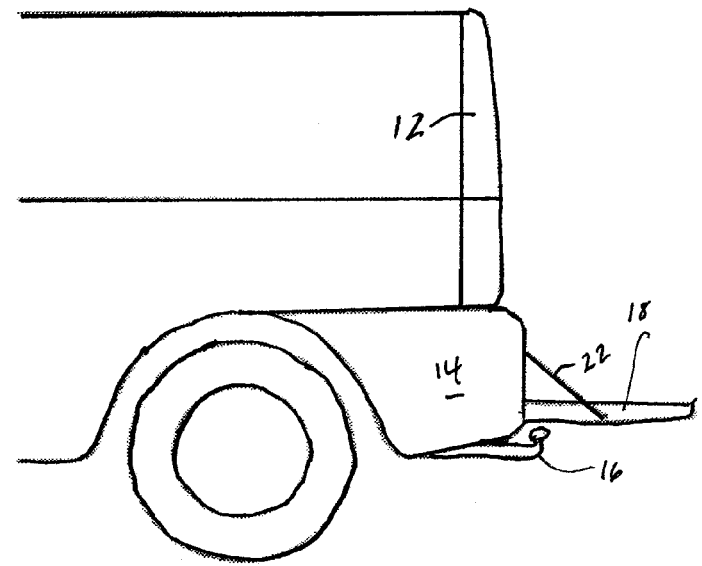
Figure 5C:
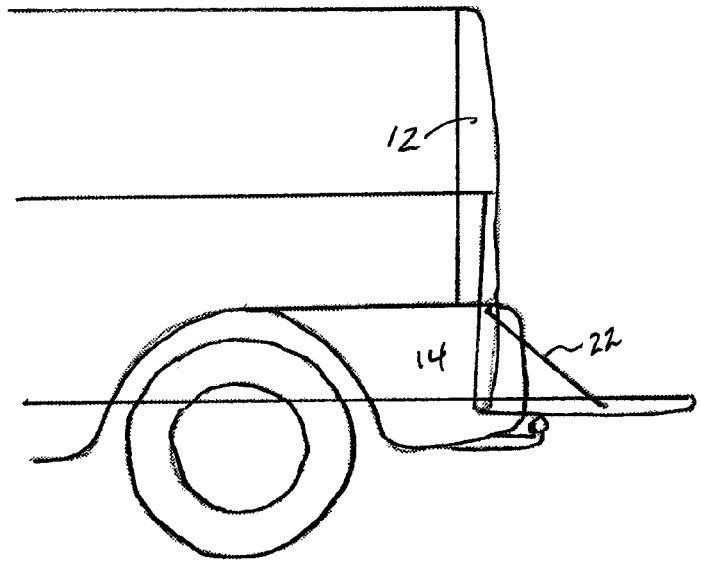
Figure 5D:
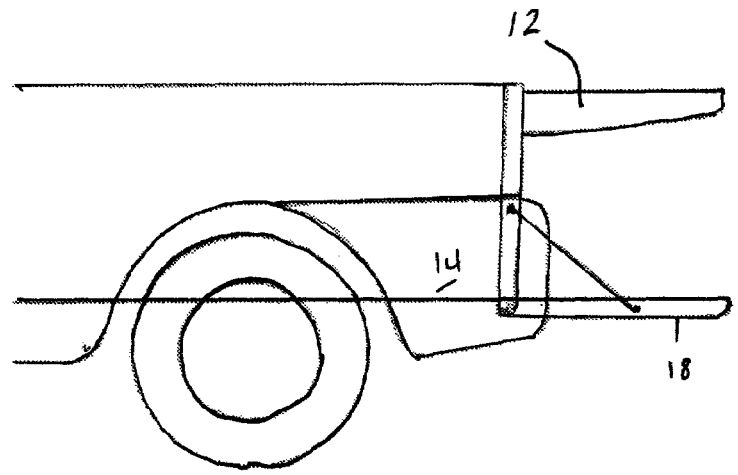
Figure 5E:
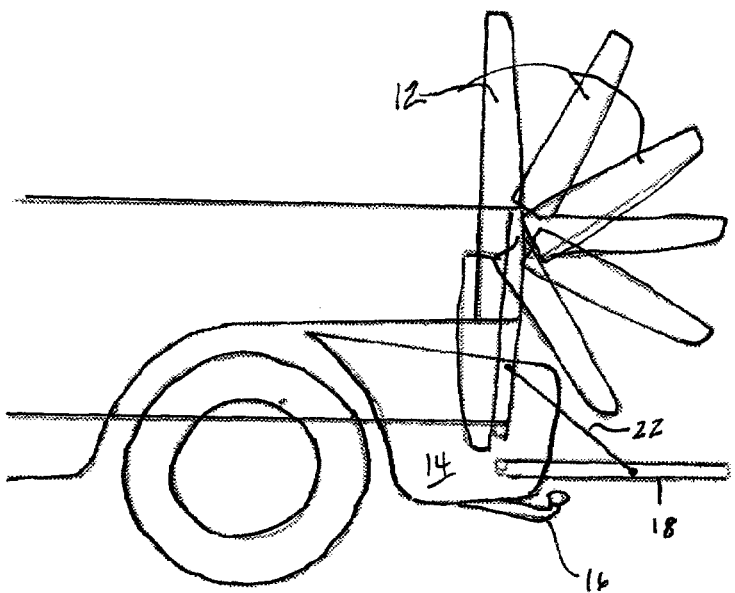
Figure 5F:
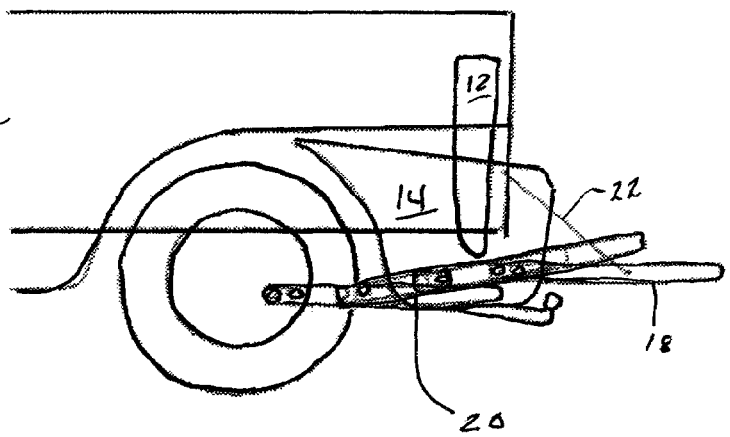
Figure 5G:
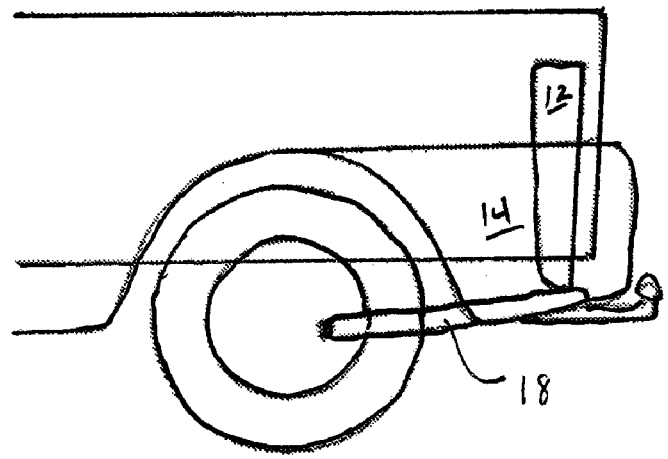
Figure 5H:
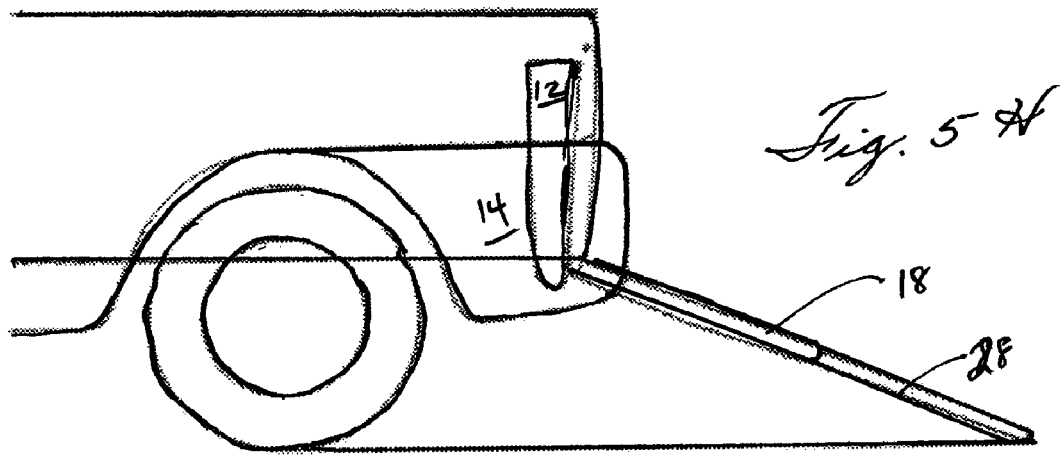
Figure 5I:
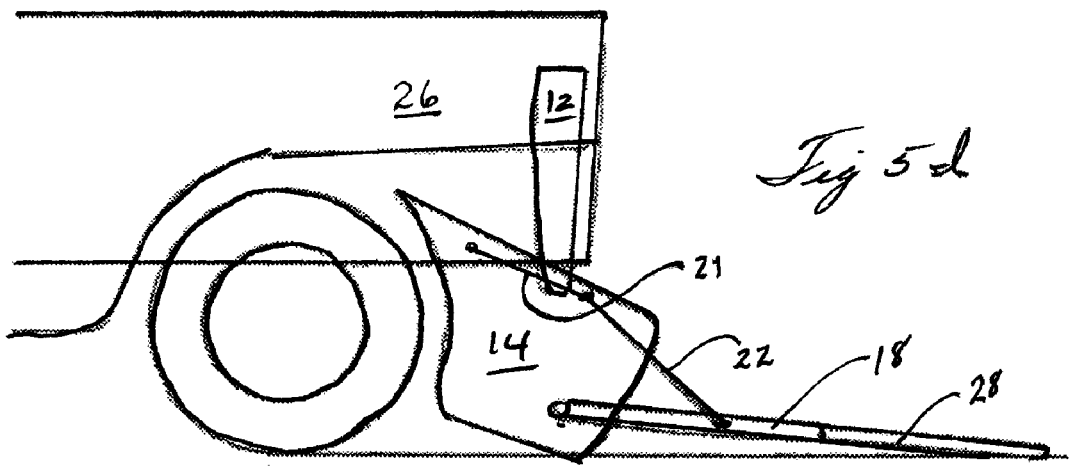

A method by which one embodiment of the present invention is illustrated in FIGS. 5A-5I. FIG. 5A illustrates a fully deployed rear roll bar and a tailgate in an upright position. As illustrated in FIG. 5B, to dispose the roll bar within the body of the vehicle, the tail gate 18 is opened, all window lights within the tailgate 18 are retracted or "rolled down" to protect them and to facilitate opening and closing of the tailgate. FIG. 5C illustrates the internal workings of the opened tail gate 18. As further illustrated in FIG. 5E, the roll bar 12 rotates around an axis disposed through the top of the bed from its fully deployed position to a fully stowed position. Also illustrated in this figure the tail gate 18 may be configured to be hinged to the bumper 14. The bumper 14 may be configured to be depressed or lowered during the transition of the roll bar between a deployed and a stowed position to permit the stowing of the roll bar 12 behind the bumper 14. Likewise, embodiments may be provided where the bumper 14 may be raised or lowered independently of the roll bar's position to allow for movement of trailer hitches, increased rear visibility, or to facilitate loading of the vehicle.

In an embodiment illustrated in FIG. 5F the bumper 14 may be configured with a storage area or well 20 beneath the truck bed wherein the tailgate 18 itself may be stowed as more fully illustrated in FIG. 5G. Such an embodiment would permit the installation of a tale gate ramp 18 which could extend, as shown in FIG. 5H, from the body of the vehicle to the ground to permit the loading of rolling or heavy items. The means by which the tailgate 18 may be actuated vary, but include cables, an actuated bumper system having a greater freedom of movement than that of the previous paragraph. As illustrated in FIG. 5I, and actuateable bumper 14 can facilitate the use of such an extendable tailgate 18,28 as a lift. In one such embodiment, a linkage converts the vertical motion of the bumper and attached tailgate to a horizontal motion of a restraint strap so as to keep the tailgate level. The actual linkage 21 used may include a ridged metal strap attached with a pivot pin to the tailgate. The other end of the strap is attached with a pin through a horizontal slot in the bumper to another strap on the other side of the slot. The other end of that strap or cable is attached to the chassis at exactly the right place to give the desired motion.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The invention claimed is:

1. A vehicle tailgate system, the system comprising:
   A primary arch, said primary arch being hingably coupled to side walls of a vehicle bed;
   An actuator whereby said primary arch is rotated between a fully deployed roll bar position, and a fully stowed position;
   A channel, configured to receive the primary arch disposed in said vehicle bed, said channel running down a first side of the vehicle bed, between exterior and interior walls of said first side, along a bottom of the vehicle bed beneath a floor of the vehicle bed, and up a second side of the bed between exterior and interior walls of said second side of the vehicle bed.

2. The system of claim 1 wherein said actuator comprises a drive mechanism selected from the group of drive mechanisms consisting of screw actuators, pneumatic drives, hydraulic drives, chain drives and combinations thereof.

3. The system according to claim 1 further comprising a vehicle bumper configured to be lowered.

4. The system according to claim 1 further comprising a stowable tailgate wherein said tailgate is configured to be received by a tailgate receiving chamber.

5. The system according to claim 4 wherein said tailgate is stowed manually or under power.

6. The system according to claim 1 wherein a tailgate is configured to unfold into a loading ramp.

7. The system according to claim 1 wherein a tailgate is hinged from the bumper and a restraint is attached through a horizontal slide slot in the bumper to the chassis.

8. The system according to claim 7 wherein horizontal movement of the restraint during vertical travel of the bumper holds the tailgate substantially parallel to the ground through its vertical travel with the bumper.

9. The system according to claim 3 wherein said bumper is configured to move vertically.

10. The system according to claim 9 wherein said primary arch is configured to be stowed behind said bumper.

\* \* \* \* \*